United States Patent [19]

Kamata et al.

[11] Patent Number: 4,712,446
[45] Date of Patent: Dec. 15, 1987

[54] ANTI-VIBRATION STRUCTURE OF A STEERING ARRANGEMENT

[75] Inventors: Mitsuo Kamata, Chigasaki; Yutaka Yamashita, Hiratsuka, both of Japan

[73] Assignee: Nissan Shatai Company, Limited, Kanagawa, Japan

[21] Appl. No.: 820,001

[22] Filed: Jan. 21, 1986

[30] Foreign Application Priority Data

Aug. 9, 1985 [JP] Japan .................. 60-175242

[51] Int. Cl.⁴ .................................... B62D 1/04
[52] U.S. Cl. ................................. 74/492; 74/552
[58] Field of Search ............ 74/552, 492, 493; 403/225

[56] References Cited

U.S. PATENT DOCUMENTS

| 2,408,388 | 10/1946 | George ............... 74/552 |
| 3,596,532 | 8/1971 | Wilfert et al. ....... 74/552 |
| 3,643,981 | 2/1972 | Grandel et al. ..... 74/492 X |
| 3,659,476 | 5/1972 | Wifert et al. ....... 74/492 |
| 4,116,087 | 9/1978 | Zeller ................. 74/492 X |
| 4,216,842 | 8/1980 | Decouzon ......... 74/492 X |

FOREIGN PATENT DOCUMENTS

| 2359698 | 6/1975 | Fed. Rep. of Germany ........ 74/552 |
| 2424906 | 12/1975 | Fed. Rep. of Germany ........ 74/492 |
| 3001561 | 7/1981 | Fed. Rep. of Germany ........ 74/492 |
| 28546 | 2/1980 | Japan . |
| 91369 | 6/1980 | Japan . |
| 95969 | 7/1981 | Japan . |
| 95967 | 7/1981 | Japan . |
| 177771 | 10/1983 | Japan ................. 74/492 |
| 154452 | 10/1984 | Japan . |
| 341185 | 1/1931 | United Kingdom .......... 74/552 |
| 2068314 | 8/1981 | United Kingdom .......... 74/552 |

Primary Examiner—Cornelius J. Husar
Assistant Examiner—Joseph A. Fischetti
Attorney, Agent, or Firm—Bachman & LaPointe

[57] ABSTRACT

A dynamic damper comprising at least one elastic member and mass member is mounted within a conventional shaft housing eccentrically with respect to an axis center of a steering shaft. The elastic member of the dynamic damper gives a spring constant which is maintained at a constant value designed to provide a required resonant frequency at the mass member for suppresing a vibration transmitted to a steering wheel via the steering shaft since the vibration transmitted from the steering shaft to the steering wheel is always applied to the dynamic damper in the shear direction of said elastic member regardless of the steering wheel angular position.

8 Claims, 5 Drawing Figures

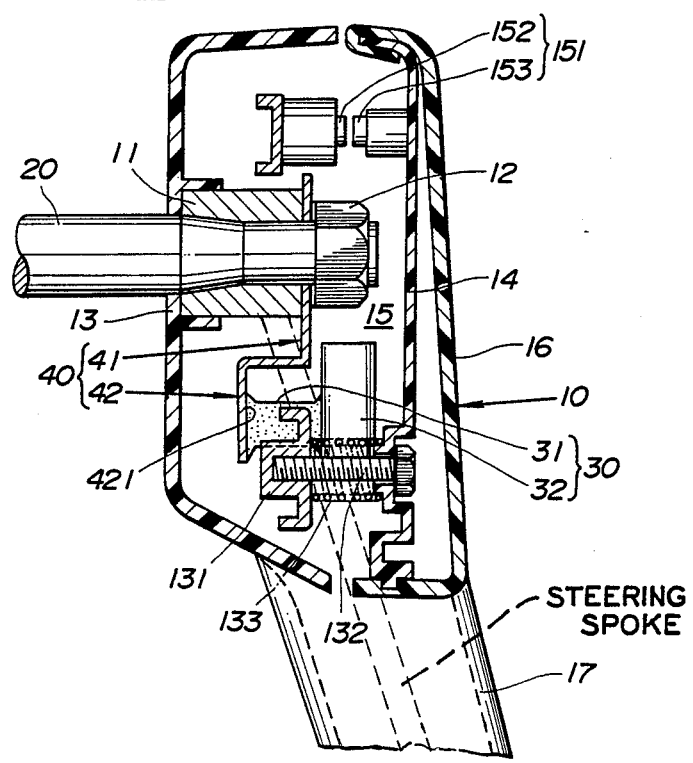
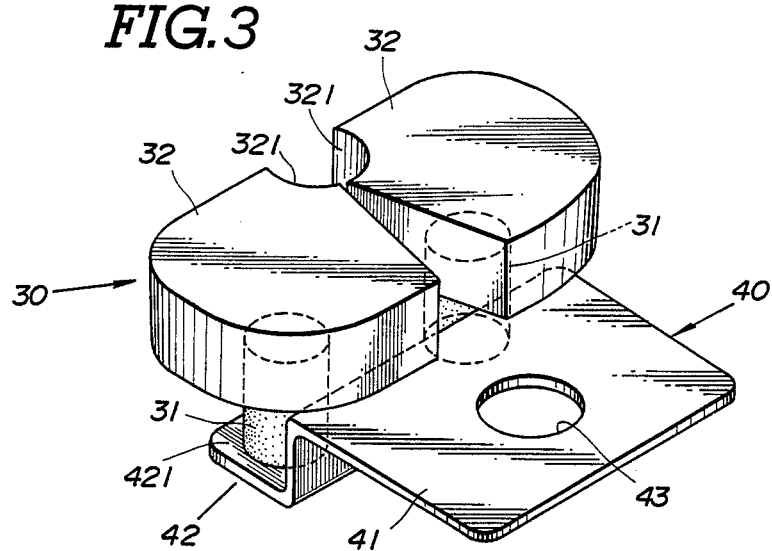

ANTI-VIBRATION STRUCTURE OF A STEERING ARRANGEMENT

BACKGROUND OF THE INVENTION

1. Field of the Invention

The present invention relates to a structure of a steering arrangement applicable to an automotive vehicle and more particularly to an anti-vibration structure of the vehicular steering arrangement in which a dynamic damper is provided for damping a vibration of a steering wheel caused by a flexural vibration of a steering column regardless of a steering movement position and direction.

2. Description of the Prior Art

Conventional anti-vibration structures of the steering gear arrangements are exemplified by Japanese Utility Model Applications Unexamined Open No. Sho. 55-28,546 and No. Sho. 59-154,452.

The conventional anti-vibration structure disclosed in the former Japanese Utility Model Application has a feature that a dynamic damper having an inherent vibration frequency substantially matched with a resonance frequency point of the steering arrangement is installed within a post portion of a steering wheel attached to a tip of a steering shaft.

On the other hand, the other conventional anti-vibration structure disclosed in the latter Japanese Utility Model Application has a feature that the dynamic damper is housed within a space of a shaft housing comprising a pad mark fixed on a side wall of a supporting fixture fixed on an upper end of the steering shaft and a boss above which the pad mark surrounds, an attachment surface of an attachment bracket on which an elastic body constituting the dynamic damper is mounted vertically is in parallel to an axis center of the steering shaft, and the elastic body is arranged eccentrically with respect to the axis center of the steering shaft.

However, the above-described conventional anti-vibration structures of the steering arrangement have the following drawbacks.

That is to say, since in the structure of the steering arrangement disclosed in the former Japanese Utility Model Application the dynamic damper is installed on the post portion located on the axis end of the steering shaft, the post portion requires a large space at an upper part in the axial direction of the steering shaft so that the center of the steering shaft is largely projected toward a space of a driver's seat, thus the steering wheel being unsightly. In addition, since a relatively large space is created around the dynamic damper and base plate supporting the damper, an efficiency of utilizing space is reduced.

On the other hand, since in the other conventional structure of the steering arrangement in the latter Japanese Utility Model Application, the dynamic damper is installed eccentrically to the axial center of the steering shaft, the upper part of the steering shaft and accordingly a center part of the steering wheel is not largely projected toward the driver's seat and the spatial utilization efficiency is not reduced. However, since the axis direction of the elastic body constituting the dynamic damper is orthogonal to the axis direction of the steering shaft, the following problems arises.

The steering shaft usually generates a flexural vibration in the upper and lower directions thereof due to fluctuations of a vehicle body transmitted from a vehicular engine. Therefore, the steering wheel and dynamic damper both located on the upper end of the steering shaft also vibrate in the upper and lower directions. When the steering wheel is steered in an equbrium position so that the vehicle moves in the straight direction, the vibration of the steering shaft is inputted in a shearing direction of the elastic body so that the elastic body can produce a set spring constant and a mass body can resonate the vibration of the steering shaft in a specified way so as to damp the vibration. However, if the steering wheel is steered so that the vehicle moves in other directions than the straight direction, the vibration of the steering shaft acts on a compression direction of the elastic body so that the vibration direction of the steering shaft does not coincide with a displacement direction of an upper surface (facing toward the mass body) of the elastic body. Consequently, the spring constant of the elastic body varies, thus mass body connot be resonated so as to damp the vibration of the steering shaft.

SUMMARY OF THE INVENTION

With the above-described various drawbacks of the conventional anti-vibration structures of the respective steering arrangements in mind, it is an object of the present invention to provide an anti-vibration structure of a steering arrangement in which the dynamic damper comprising the elastic member and mass member is built in the steering shaft housing in order to considerably damp the vibration of the steering wheel caused by a bending vibration of the steering column regardlessly of the steering wheel angular position and direction. This can be achieved by an anti-vibration structure of a steering arrangement, comprising: (a) a shaft housing formed on a center part of a steering wheel attached to an upper end of a steering shaft; and (b) means, located within the shaft housing eccentrically with respect to an axis center of the steering shaft and arranged so as to always receive a vibration transmitted to the steering shaft in a shear direction thereof for constantly damping the vibration regardlessly of a steering angular position and direction of the steering wheel.

BRIEF DESCRIPTION OF THE DRAWINGS

A more complete understanding of the present invention may be obtained from the following detailed description taken in conjunction with the attached drawings in which like reference numerals designate corresponding elements and in which:

FIG. 1A is a sectional view of a preferred embodiment of an anti-vibration structure of a steering arrangement A according to the present invention;

FIG. 3 is a perspective view of an essential part of the structure shown in FIGS. 1 and 2.

DETAILED DESCRIPTION OF THE PREFERRED EMBODIMENT

Figure 1B:
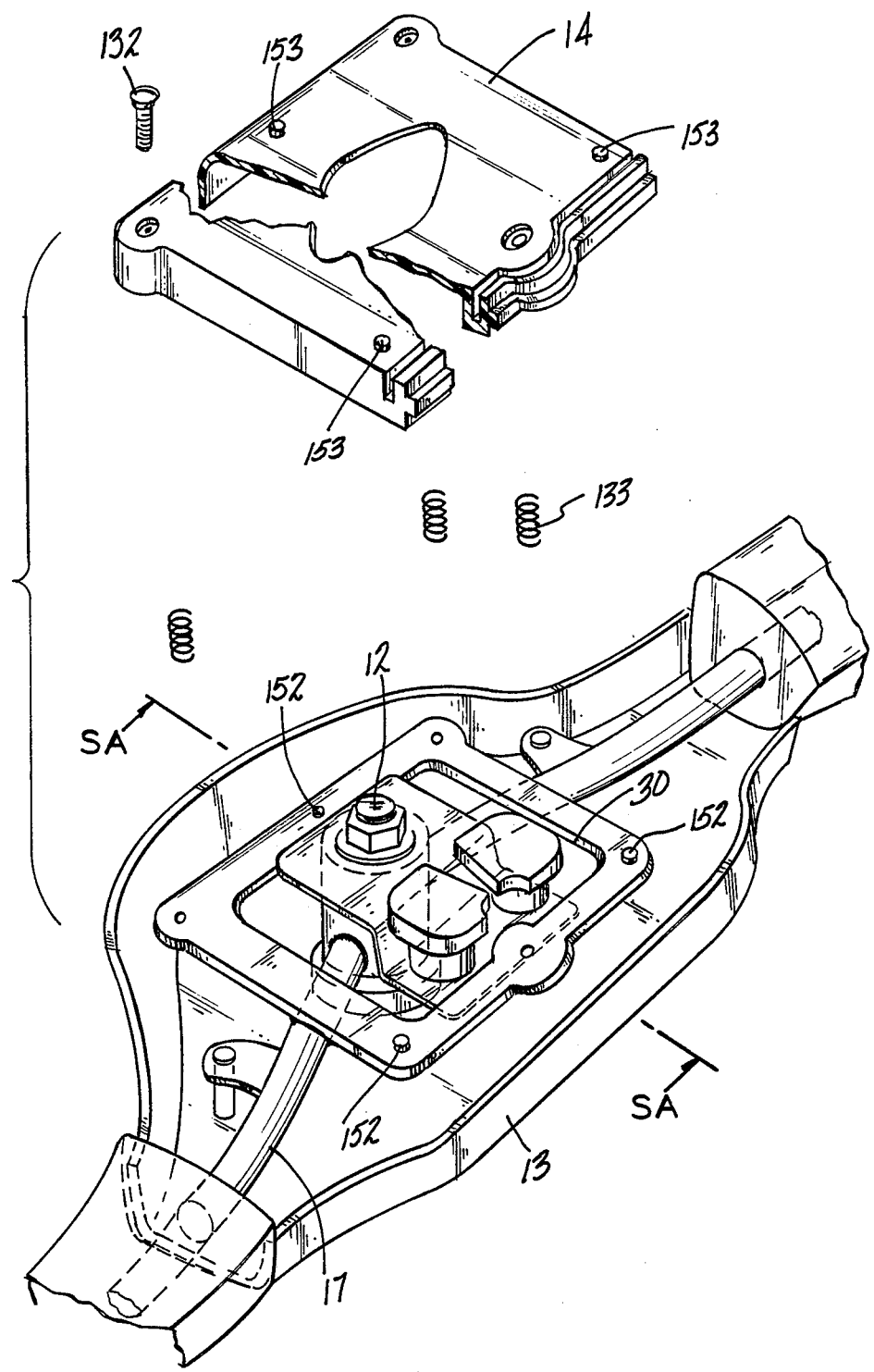
FIG. 1B is an exploded view of the anti-vibration structure of FIG. 1A.

Reference will hereinafter be made to the drawings in order to facilitate understanding of the present invention.

First, an automotive vehicle steering arrangement will be described below with reference to FIGS. 1 through 3. Symbol A denotes a steering arrangement comprising basically: a steering wheel 10; a steering shaft 20; a dynamic damper 30; and a fixing bracket 40.

The above-described steering wheel 10 carries out a steering operation of the automotive vehicle, as is well known in the art. The steering wheel 10 is fixed to the steering shaft 20 by means of a boss 11 fastened to a nut 12 and connected to a steering gear (not shown) via the steering shaft 20.

A lower cover 13 encloses a lower side of the boss 11 of the steering wheel 10 and an upper cover 14 encloses an upper side of the boss 11 so that a shaft housing 15 is formed between the lower cover 13 and upper cover 14 as shown in FIG. 1.

The above-described upper cover 14 is attached to a mounting portion 131 formed on the lower cover 13 by means of a pin 132 and is elastically supported by means of a spring 133 wound over the pin 132.

It is noted that the above-described shaft housing 15 has the same size as that in the case of which the dynamic damper 30 is not installed.

In addition, the upper cover 14 is furthermore covered with a horn cover 16. Numeral 17 denotes a spoke portion for linking between the lower cover 13 and rim portion 18 as shown in FIG. 2.

Figure 2:
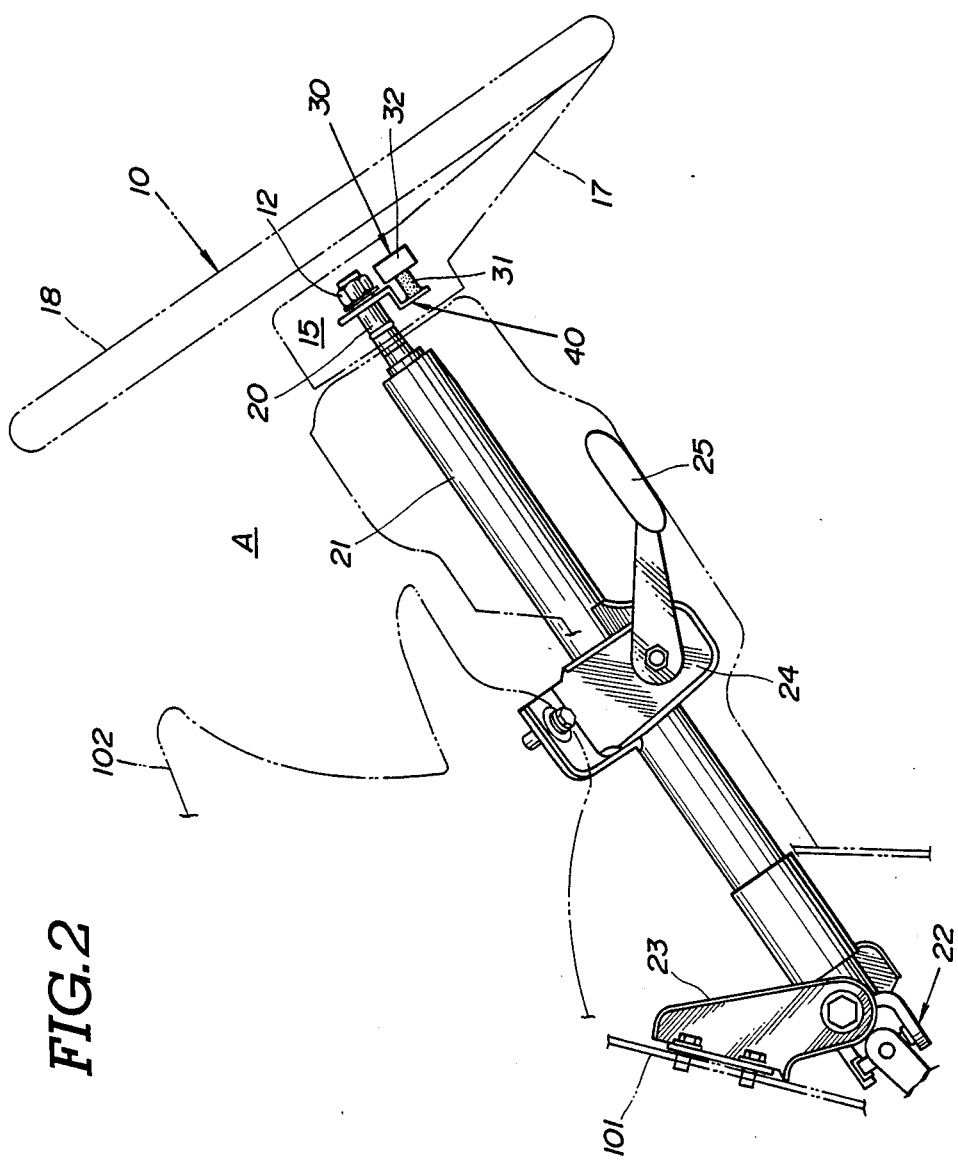
FIG. 2 is an overall view of the steering arrangement shown in FIG. 1.

The above-described steering shaft 20 is, as shown in FIG. 2, enclosed with the steering column 21 and the lower part thereof is connected to the steering gear proper (not shown) via an universal joint 22.

The above-described steering column 21 has its lower end fixedly supported to the fixed bracket 23 and its center part supported on a bracket 24 of a steering wheel tilting mechanism. It is noted that numeral 25 denotes a tilt lever with which an inclination of the steering shaft 20 with respect to the driver can be adjusted.

The above-described fixed bracket 23 is fixed to a dash front panel 101 and the bracket 24 of the tilting mechanism is fixed on the lower part of an instrument panel 102 as is well known in the art.

It is noted that a horn switch 151, dynamic damper 30, and mounting bracket 40 are housed within the above-described shaft housing 15.

The above-described horn switch 151 includes two electrical contacts 152, 153 disposed so as to face toward the lower cover 13 and upper cover 14, respectively. When the horn cover 16 is depressed, the one contact 153 is moved toward a direction which compresses the spring 133 together with the upper cover 14 and thereafter is brought in contact with the opposing contact 152, thereby a horn unit (not shown) produces a sound.

The above-described dynamic damper 30 serves to damp the vibration of the steering wheel 10 through a resonation action and is fixed to the steering shaft 20 by means of the fixing bracket 40.

The above-described bracket 40 is a plate typically made of iron having a substantially L shaped section and comprising a fixing piece 41 and mounting piece 42 as shown in FIG. 1, the fixing piece 41 having a fixing hole 43 opened therethrough as shown in FIG. 3. The steering shaft 20 is inserted through the fixing hole 43 and fixed to the lower cover 13 and to the fixing bracket 40 by means of the above-described nut 12 preferably via a washer. It should be noted that the above-described mounting piece 42 is formed with a mounting surface 421 which is substantially orthogonal to the axis center of the above-described steering shaft 20.

The above-described dynamic damper 30 comprises two cylindrical elastic members 31, 31 each made of rubber and two mass members 32, 32 each made of metal. One end of each elastic member 31, 31 is attached to a mounting surface 421 of the mounting bracket 40 and the other end thereof is attached to the corresponding mass member 32 as shown in FIG. 3. On the other hand, the length of each elastic member 31 is set such that the vapor end of the mass member 32 has substantially the same height as the tip of the steering shaft 20 as shown in FIG. 1.

The weight of each mass member 32 is set such that the mass members 32, 32 resonate to the vibration frequency in the steering shaft 20 when an engine of the vehicle is in an idling state. Furthermore, cut out portions 321, 321 are formed on opposing ends of the mass members 32, 32 so as not to contact with the spring 133 and the pin 132 for suitably mounting the above-described upper cover 14 onto the above-described mounting portion 131.

Next, an action of the anti-vibration structure of the steering arrangement in the preferred embodiment will be described with reference to FIGS. 1 through 4.

When the engine (not shown) is driven, the vehicle body generates an irregular vibration at each part thereof accordingly. Such a vibration is inputted to the steering shaft 20 via the universal joint 22 and bracket 24.

This vibration causes a bending vibration in the upper and lower directions to generate on the tip of the steering shaft 20. Furthermore, due to a long distance from the tip of the steering shaft 20 to the bracket 24 attached substantially to the center thereof for supporting the tip of the steering shaft 20, the tip thereof becomes easily susceptible to a large-amplitude vibration. However, during the engine idling state, this large-amplitude vibration is damped through the resonance action of the dynamic damper 30.

At this time, since the mounting surface 421 is orthogonal to the steering shaft 20 and is formed so as to be in parallel to the vibration direction of the steering shaft 20, the vibration of the steering shaft is transmitted along the shear direction of the elastic members 31. The surface of the elastic members 31 opposite to the mass members 32 is displaced in parallel to the direction of vibration acting on the fixing bracket 40 so that a spring constant which accords with a given value designed to provide a required resonant frequency can be obtained. Furthermore, if the steering angle is changed with respect to the equilibrium position through the rotation of the steering wheel 10, the vibration of the steering shaft 20 is applied not to the compression direction but to the shear direction of the elastic members 31 so that the spring constant designed to provide the required resonant frequency can easily be obtained.

In this way, the effect of damping the vibration can be produced regardlessly of the steering movement position and direction.

Figure 4:
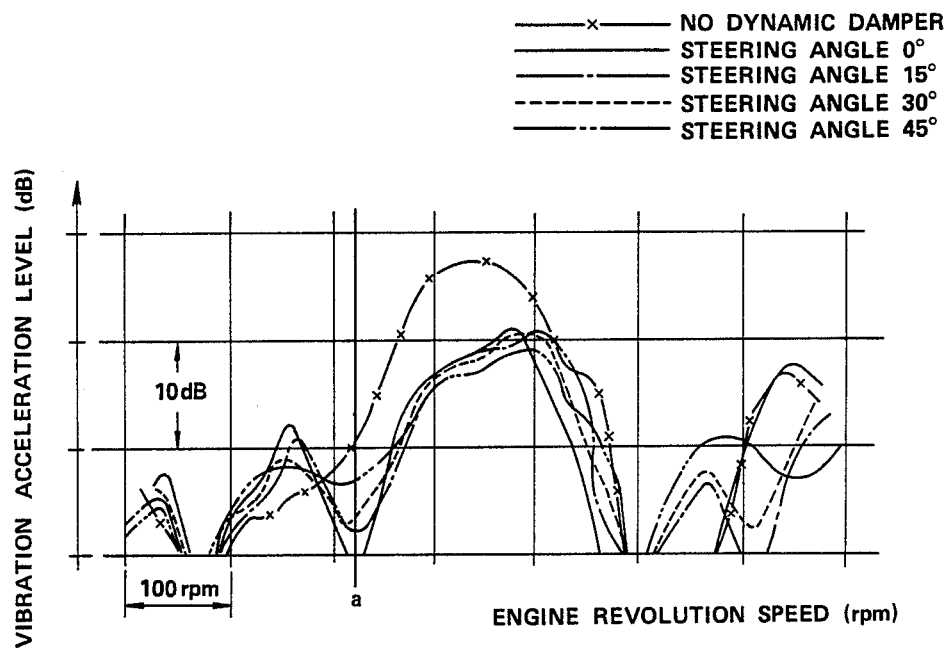
FIG. 4 is a characteristic graph representing a vibration acceleration level when an angular position of a steering wheel in the steering arrangement shown in FIGS. 1, 2, and 3 and in the case of no mounting of damper means is changed.

FIG. 4 shows experimental results of a vibration acceleration level (in a unit of dB) with respect to the engine revolution speed (in a unit of rpm) when the steering wheel with respect to the equilibrium position is rotated through 0°, 15°, 30°, and 45° in either clockwise or counterclockwise direction.

As appreciated from FIG. 4, the effect of damping the vibration can remarkably be obtained in an engine idling state denoted by region a regardlessly of the steering angle position and direction.

In addition, since the dynamic damper 30 is disposed so that the upper ends of the mass members 32, 32 have substantially the same height as the tip of the steering shaft 20, the shaft housing 15 is not largely projected toward the driver's seat. Since cut-out portions 321, 321 are provided at opposing ends of the mass members 32, 32 so that the mass members 32, 32 are not contacted with other members within the shaft housing 15, a space within the shaft housing can be saved and the structure of shaft housing 15 can commonly be used for a vehicle in which such a damper is not housed within the shaft housing.

It is desirable that the shape of the mounting bracket 40 may not be limited to that shown in the preferred embodiment of FIG. 1 if it is properly housed into the shaft housing 15 and can mount the dynamic damper thereon.

In addition, the numbers of mounting bracket, mass members, and elastic members are not limited to those described in the preferred embodiment.

As described hereinabove, since in the anti-vibration structure of the steering arrangement according to the present invention, the mounting surface of the dynamic damper is formed in substantially orthogonal to the axis center of the steering shaft and the mass members and elastic members are arranged at portions eccentric with respect to the axis center of the steering shaft, the vibration transmitted to the steering shaft is applied to the elastic member(s) in their (its) shearing direction(s) and therefore the elastic member(s) always provide(s) given spring constants designed to provide the required resonant frequency. Consequently, the effect of damping the vibration can always be produced regardless of the steering angular position and direction. Furthermore, since the shaft housing is not largely projected from the tip of the steering shaft in the axial direction thereof, the appearance is not unsightly, there is less danger for the driver when the vehicle collides with an object, and the utilization efficiency of space in the shaft housing is increased.

It will clearly be understood by those skilled in the art that the foregoing description is made in terms of the preferred embodiment and various changes may be made without departing the scope of the present invention which is to be defined by the appended claims.

What is claimed is:

1. An anti-vibration structure of a steering arrangement for a vehicle, comprising:
   (a) a shaft housing having an inner space defined by a lower cover attached to an upper end of a steering shaft and an upper cover resiliently supported on the lower cover and formed on a center part of a steering wheel attached to an upper end of the steering shaft via the lower cover of the steering wheel;
   (b) a mounting bracket housed within said shaft housing and having at least two parts, one part being formed with a fixing surface which is fixed to the upper part of the steering shaft, the other part being formed with a mounting surface substantially in parallel to the fixing surface of the one part, the mounting surface being positioned eccentrically with respect to an axis center of the steering shaft and nearer to the lower cover than the fixing surface, and both fixing surface and mounting surface forming a plane orthogonal to an axial direction of the steering shaft; and
   (c) a dynamic damper including at least one elastic member and at least one mass member, housed within said shaft housing with one end of said elastic member fixed to said mounting surface so as to be in parallel to the axial direction of said steering shaft and the other end of said elastic member fixed to said mass member, for damping a vibration occurring on the steering wheel transmitted from said steering shaft regardlessly of a rotational angle and direction of the steering wheel.

2. The anti-vibration structure according to claim 1, wherein a spring constant of said elastic member is designed to be maintained at a constant value when the steering wheel is rotated.

3. The anti-vibration structure according to claim 1, wherein said mass member has a predetermined weight and wherein a total height of said elastic and mass members from said mounting surface are substantially equal to that of the upper end of said steering shaft which is spaced from said upper cover of the steering wheel.

4. The anti-vibration structure according to claim 3, wherein said elastic member is designed to always provide a given value of spring constant so that said mass member provides a required resonant frequency which coincides with a frequency of vibration transmitted to said elastic member.

5. The anti-vibration structure according to claim 4, wherein said elastic member is made of rubber and said mass member is made of metal.

6. The anti-vibration structure according to claim 1, wherein said damping means comprises: two cylindrical shaped elastic members, each one end of the elastic members fixed to said mounting surface; and two mass members, each one end of the mass members fixed to the other end of each of said elastic members, said two mass members having cut-out portions at their opposing ends so that means for mounting an upper cover of said shaft housing on a mounting portion formed on the lower cover of the shaft housing is not contacted with said mass members.

7. The anti-vibration structure according to claim 3, wherein said predetermined weight is set so that the required frequency of resonance is obtained at said mass member.

8. The anti-vibration structure according to claim 1, wherein said damping means comprises: at least one cylindrical shaped elastic member, each one end of said at least one cylindrical shaped elastic member fixed to said mounting surface; and at least one mass member, each one end of said at least one mass member fixed to the other end of each of said at least one cylindrical shaped elastic member, each of said at least one mass member having a cut-out portion at its opposing ends so that means for mounting an upper cover of said shaft housing on a mounting portion formed on the lower cover of the shaft housing is not contacted with said mass member.

* * * * *